United States Patent [19]

Schiller et al.

[11] 4,191,817

[45] Mar. 4, 1980

[54] CURABLE COMPOSITIONS AND ELASTOMERS PREPARED THEREFROM

[75] Inventors: August Schiller, Marktl,Bergham; Eckhart Louis; Erhard Bosch, both of Burghausen; Karl Braunsperger, Raitenhaslach, all of Fed. Rep. of Germany

[73] Assignee: Wacker-Chemie GmbH, Munich, Fed. Rep. of Germany

[21] Appl. No.: 925,909

[22] Filed: Jul. 19, 1978

[30] Foreign Application Priority Data

Aug. 18, 1977 [DE] Fed. Rep. of Germany ....... 2737303

[51] Int. Cl.$^2$ ............................................. C08G 77/26
[52] U.S. Cl. .................... 528/38; 260/37 SB; 428/429; 428/447; 428/457; 528/34; 528/43; 528/901; 525/474
[58] Field of Search ...................... 528/901, 34, 38, 11, 528/43

[56] References Cited

U.S. PATENT DOCUMENTS

| | | | |
|---|---|---|---|
| 3,519,600 | 7/1970 | Pande et al. | 528/901 |
| 3,647,725 | 3/1972 | Nitzsche et al. | 528/901 |
| 3,674,738 | 7/1972 | Nitzsche et al. | 528/901 |
| 3,678,003 | 7/1972 | Kaiser et al. | 528/901 |
| 3,758,441 | 9/1973 | Nitzsche et al. | 528/901 |
| 4,008,198 | 2/1977 | Krohberger et al. | 528/38 |

*Primary Examiner*—Melvyn I. Marquis

[57] ABSTRACT

Curable compositions which can be stored under anhydrous conditions, but when exposed to atmospheric moisture cross-link to form elastomers, which consists of (1) a diorganopolysiloxane having terminal condensable groups, (2) a silicon compound containing at least three hydrolyzable groups per molecule in which the hydrolyzable groups are amino groups bonded to silicon via nitrogen and/or oxime groups bonded to silicon via oxygen and (3) at least one additional component which improves adhesion of the elastomers obtained from said compositions to substrates, in which the additional component (3) is an organosilicon compound containing at least one siloxane-oxygen atom and at least one amino group which is bonded to silicon by carbon.

7 Claims, No Drawings

CURABLE COMPOSITIONS AND ELASTOMERS PREPARED THEREFROM

The present invention relates to room temperature vulcanizable compositions and more particularly to room-temperature vulcanizable compositions which may be stored under anhydrous conditions, but when exposed to moisture, cure to form elastomers that adhere tenaciously to a wide variety of substrates.

BACKGROUND OF INVENTION

Compositions which can be stored under anhydrous conditions, but when exposed to moisture at room temperature, cure to form elastomers are described in U.S. Pat. No. 3,678,003 to Kaiser et al. These compositions consist of (1) organopolysiloxanes having terminal condensable groups, (2) a silicon compound having at least 3 amino groups bonded to silicon by nitrogen and/or oxime groups bonded to silicon via oxygen per molecule, and at least one additional component (3) which serves to improve the adhesion of these compositions on substrates. The additional component consists of at least one organosilicon compound having at least one amino group which is bonded to silicon via carbon. In these compositions, component (3) is at least a silane, i.e., a monomeric silicon compound and said silane contains in addition to at least one amino group which is bonded to silicon via carbon, at least one monovalent hydrocarbon radical which is bonded to silicon via oxygen and which may be substituted with an amino or an alkoxy group. Compared to compositions known heretofore, the compositions of this invention have certain advantages. For example, the compositions of this invention cure completely even when applied as a thick section. The complete deep section curing of the compositions of this invention takes place even in the absence of any condensation catalysts, such as dibutyltin dilaurate.

Therefore, it is an object of this invention to provide a composition having improved adhesion to a variety of substrates. Another object of this invention is to provide a composition which cures completely even when applied as a thick section. A further object of this invention is to provide a composition which exhibits deep section curing even in the absence of condensation catalysts. A still further object of this invention is to provide a composition which is stable under anhydrous conditions, but when exposed to moisture, cures to an elastomer. The foregoing objects and others will become apparent from the following description.

SUMMARY OF INVENTION

This invention relates to curable compositions which can be stored under anhydrous conditions, but when exposed to moisture, cure to elastomers consisting of (1) a diorganopolysiloxane having terminal condensable groups, (2) a silicon compound containing at least three hydrolyzable groups per molecule in which the hydrolyzable groups are amino groups bonded to silicon via nitrogen and/or oxime groups bonded to silicon via oxygen, and (3) at least one organosilicon compound containing at least one siloxane-oxygen atom and at least one amino group which is bonded to silicon via carbon.

DETAIL DESCRIPTION OF INVENTION

The curable compositions of this invention can be prepared from the same diorganopolysiloxanes having terminal condensable groups (1) which have been used heretofore to prepare compositions which can be stored under anhydrous conditions but when exposed to moisture at room temperature, cure to form elastomers. The curable compositions consist of a diorganopolysiloxane having terminal condensable groups and a silicon compound having at least three hydrolyzable groups per molecule, in which at least three amino groups are bonded to silicon by nitrogen and/or oxime groups are bonded to silicon by oxygen. The organopolysiloxanes (1) having terminal condensable groups, which are generally used in the preparation of such compositions and which are also preferred for the purposes of this invention, can be represented by the following general formula:

$$HO(SiR_2^3O)_xH$$

in which $R^3$ represents the same or different, monovalent hydrocarbon radicals, substituted monovalent hydrocarbon radicals and/or polymeric hydrocarbon radicals and x is an integer having a value of at least 10. Although this is not generally shown in the above formula, siloxane units other than the diorganosiloxane units $(SiR_2^3O)$ may be present in or along the siloxane chain. Examples of other siloxane units which are generally present as impurities, are those having the formulas: $R^3SiO_{3/2}$, $R_3^3SiO_{\frac{1}{2}}$ and $SiO_{4/2}$, where $R^3$ is the same as above. The amount of such siloxane units other than the diorganosiloxane units should preferably not exceed about 10 mol percent and more preferably, not more than about 1 mol percent, based on the weight of the diorganopolysiloxanes (1). In the above formula, the hydroxyl groups may be partially substituted or entirely substituted with condensable groups other than Si-bonded hydroxyl groups. Examples of such other condensable groups are amino groups which are bonded to silicon via nitrogen, oxime groups which are bonded to silicon via oxygen, alkoxy groups having from 1 to 5 carbon atoms and alkoxy-alkyleneoxy groups having from 1 to 5 carbon atoms, such as the radical $CH_3OCH_2CH_2O—$.

Examples of hydrocarbon radicals represented by $R^3$ are alkyl radicals, such as the methyl, ethyl, n-propyl and isopropyl radical, as well as octadecyl radicals; alkenyl radicals, such as the vinyl and the allyl radicals; cycloaliphatic hydrocarbon radicals, such as the cyclopentyl and cyclohexyl radicals, as well as methylcyclohexyl and cyclohexenyl radicals; aryl radicals such as the phenyl and xenyl radicals; aralkyl radicals, s ich as the benzyl, beta-phenylethyl and the beta-phenylpropyl radicals and the alkaryl radicals such as the tolyl radicals.

Preferred hydrocarbon substituted radicals represented by $R^3$ are halogen aryl radicals, such as chlorophenyl and bromophenyl radicals and cyanoalkyl radicals, such as the betacyanoethyl radical.

Examples of substituted polymeric and unsubstituted polymeric hydrocarbon radicals represented by $R^3$ (often referred to as modified hydrocarbon radicals) are preferably those which are obtained from the polymerization of polymerizable compounds in the presence of free radicals and diorganopolysiloxanes having the general formula:

$$HO(SiR_2O)_xH,$$

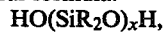

where x is the same as above and R represents the same or different, monovalent hydrocarbon radicals and substituted monovalent hydrocarbon radicals. Examples of polymerizable compounds which may be used in such a polymerization in the presence of diorganopolysiloxanes, are vinyl acetate, ethylene, styrene, acrylic acid, methacrylic acid, acrylic acid esters such as n-butyl acrylate, methacrylic acid esters, such as n-butyl methacrylate, acrylonitrile and methacrylonitrile as well as mixtures containing at least two of the above monomers, e.g., mixtures of vinyl acetate and ethylene.

Because of their availability, it is preferred that at least 50 percent of the number of the SiC-bonded radicals in the diorganopolysiloxane (1) and thus the $R^3$ radicals in the previously illustrated formulas be methyl radicals.

The diorganopolysiloxanes (1) having terminal condensable groups may be homopolymers or copolymers. Mixtures of various diorganopolysiloxanes having terminal condensable groups may be employed.

It is preferred that the viscosity of the diorganopolysiloxanes having terminal condensable groups be between 100 and 500,000 mPa.s at 25° C.

In preparing the compositions of this invention, it is possible to use as silicon compounds (2) those which have a total of at least three amino groups bonded to silicon via nitrogen and/or oxime groups bonded to silicon via oxygen per molecule. These silicon compounds are the same silicon compounds which have been or could have been used heretofore in the preparation of compositions which can be stored under anhydrous conditions but when exposed to water, cure to form elastomers by mixing such a silicon compound with diorganopolysiloxanes having terminal condensable groups.

Examples of silicon compounds which may be employed in this invention are aminosilanes having the formula:

$$R_a Si(NR_2^1)_{4-a},$$

where R is the same as above, $R^1$ represents hydrogen or a monovalent hydrocarbon radical or a substituted monovalent hydrocarbon radical and a is 0 or 1, and partial hydrolyzates thereof which may contain up to 10 silicon atoms per molecule.

Except for the vinyl radical, the previously cited examples of substituted and unsubstituted hydrocarbon radicals for R are equally applicable for the substituted and unsubstituted hydrocarbon radicals represented by $R^1$. Additional examples of hydrocarbon radicals represented by $R^1$ are the n-butyl, sec-butyl and the tert-butyl radicals. Preferably $R^1$ represents the sec-butyl and cyclohexyl radicals.

Another example of silicon compounds (2) are oxime silanes having the general formula:

$$R_a Si(ON=X)_{4-a},$$

where R and a are the same as above and X represents the following radicals: $R^1RC=$ or $R^4C=$, and partial hydrolyzates thereof having no more than ten silicon atoms per molecule, where R and $R^1$ are the same as above and $R^4$ represents a bivalent or a substituted hydrocarbon radical.

Other examples of silicon compounds (2) are silanes having the general formula:

$$R_a Si(ON=X)_c (NR_2^1)_{4-a-c}$$

where R, $R^1$ and X are the same as above, and c is on the average at least 0.1, preferably 0.5 and no more than 2.9, with the proviso that the sum of a+c must be no greater than 3.

Individual examples of silicon compounds (2) are methyltris-(n-butylamino)-silane, methyltris-(sec-butylamino)-silane, methyltris-(cylohexylamino)-silane, methyltris-(methylethylketoxime)-silane, methylbis-(methylethylketoxime)-cyclohexylaminosilane and methyltris-(acetonoxime)-silane.

Mixtures of various silicon compounds (2), for example a mixture containing 1 mol of methyltris-(cyclohexylamino)-silane and 2 mols of methyltris-(methylethylketoxime)-silane may be used.

The silicon compound (2) having at least 3 amino groups bonded to silicon via nitrogen and/or oxime groups bonded to silicon via oxygen per molecule, is preferably used in amounts which ensure the presence of at least 3 amino groups and/or oxime groups, for each terminal condensable group in the diorganopolysiloxane (1). Generally, from 0.2 to 15 percent by weight and more preferably from 1 to 8 percent by weight of the silicon compound (2) is employed based on the total weight of the composition.

An example of an organosilicon compound (3) having at least three amino groups which are bonded to silicon via carbon and having at least one siloxane-oxygen atom, are compounds of the general formula:

$$(R_3SiO)_3SiCH_2CH_{2-a}(CH_3)_a CH_2N(CH_2CH_2NR_2^1)_2$$

where R and a are the same as above. Because of their availability, it is preferred that organosilicon compounds (3) having the following formula be used:

$$Y(OSiR_2)_m(OSiAR)_n OY,$$

in which, R is the same as above and A represents the same or different radicals having the formula:

$$-(CH_2)_p[Q_a(CH_2)_p]_p NR_2^1,$$

where $R^1$ and a are the same as above and Q represents oxygen or the $-NR^1$ group, wherein $R^1$ is the same as above, p represents an integer having a value of from 1 to 10 and Y represents the same or different radicals having the formula:

$$-SiA_a(OR^2)_b R_{3-a-b},$$

where A, R and a are the same as above, $R^2$ represents hydrogen or the same or different monovalent hydrocarbon radicals which may be interrupted by at least one ether-oxygen atom, b is 0, 1, 2 or 3, with the sum of a+b being up to 3, m represents 0 or an integer having a value of from 1 to 2,000 and n represents 0 or an integer having a value of from 1 to 1,000, with the proviso that for each organopolysiloxane (3) at least one A radical must be present.

It is preferred that R represent methyl radicals in the organosilicon compound (3).

Preferred examples of radicals represent by A are those corresponding to the following formulas:

$-(CH_2)_3O(CH_2)_2NH_2$
$-(CH_2)_3NH(CH_2)_2NH_2$
$-(CH_2)_3NH(CH_2)_6NH_2$
$-(CH_2)_4NH(CH_2)_2NH(CH_2)_2NH(CH_2)_2NH(CH_2)_2-NH_2$ and
$-(CH_2)_3NH_2$.

It is readily apparent from the preceding formulas, that $R^1$ in the radical A is a hydrogen atom; however $R^1$ can represent radicals other than hydrogen as illustrated in the following radical:

$-(CH_2)_3NH(CH_2)_2N(CH_3)_2$

As shown by the above formulas, the p values in the same A radicals or in various A radicals may be the same or different.

Generally, it is preferred that the A radicals be those of the following formula:

$-(CH_2)_{p'}[Q_{a'}(CH_2)_{p''p}]_{p'''} NR_2^5$ where Q is the same as above, $R^5$ represents hydrogen and where a' and p''' are respectively 1, p' is 3 and p'' is 2.

Preferably the $R^2$ radicals have from 1 to 18 carbon atoms, and more preferably the $R^2$ radicals are methyl and ethyl radicals. A preferred example of a hydrocarbon radical represented by $R^2$ which is interrupted by an ether-oxygen atom is the methoxy-ethylene radical.

Preferably m is an integer having a value of from 3 to 1000. Furthermore, it is preferred that in the compounds having the following formula:

$$Y(OSiR_2)_m(OSiAR)_nOY,$$

that there be no more than 100 units of the formula $R_2SiO$ for each A radical.

Examples of preferred organosilicon compounds (3) are those of the following general formula:

$$R_3Si(OSiR_2)_{m'}(OSiAr)_nOSiR_3$$

where R, A and n are the same as above, m' represents an integer having a value of at least 3. Processes for the preparation of such organopolysiloxanes are generally known and have been described for example in French Pat. No. 1,184,097 to Union Carbide Corporation and French Pat. No. 1,297,045 to Union Carbide Corporation, published in "Bulletin officiel de la Propriete industrielle" No. 25 of 1962.

Additional examples of preferred organosilicon compounds (3) are those of the following general formula:

$$R(OR^2)ASi(OSiR_2)_{m'}(OSiAR)_nOSiA(OR^2)R$$

where R, $R^2$, A, m' and n are the same as above. Such organopolysiloxanes can for example be prepared by reacting at least one compound of the general formula:

$$(R^2O)_2SiAr$$

where A, R and $R^2$ are the same as above with at least one organopolysiloxane of the general formula:

$$HO(SiR_2O)_{m'}H$$

where R and m' are the same as above, and if desired in the presence of a condensation catalyst such as sodium hydroxide or dibutyltin dilaurate, with the dissociation of a compound of the following general formula:

$$R^2OH.$$

Other examples of preferred organosilicon compounds (3) are those of the following general formula:

$$A_{3-b}(R^2O)_bSi(OSiR_2)_{m'}(OSiAR)_nOSi(OR^2)_bA_{3-b}$$

where R, $R^2$, A, b, m' and n are the same as above with the proviso that on the average at least one A radical must be present per molecule. Methods for preparing such organopolysiloxanes are also known in the art, such as, for example German patent application No. 2,339,761, to Stauffer Chemical Company and French Pat. No. 1,294,235, published in "Bulletin officiel de la Propriete industrielle" No. 21 of 1962; to Dow Corning Corporation.

Of course there may be present within or along the siloxane chains of the formulas representing the oganosilicon compounds (3), siloxane units other than the diorganopolysiloxane units $SiR_2O$ and SiAr units. Examples of such other siloxane units are those having the formulas $RSiO_{3/2}$, $R_3SiO_{\frac{1}{2}}$ and $SiO_{4/2}$, where R is the same as above. Preferably siloxane units other than the diorganosiloxane units should not exceed more than 10 mol percent in the organosilicon compounds (3).

It is preferred that the organosilicon compounds (3) be employed at the rate of from 0.1 to 20 percent by weight and more preferably at the rate of 0.1 to 5 percent by weight, based on the total weight of the composition.

In addition to diorganopolysiloxane (1) containing terminal condensable groups, the silicon compound (2) which comprises at least three hydrolyzable groups per molecule in which the hydrolyzable groups are amino groups bonded to silicon via nitrogen and/or oxime groups bonded to silicon via oxygen, and an organosilicon compound (3) which contains at least one amino group which is bonded to silicon via carbon and at least one siloxane oxygen atom, it is possible to use in the preparation of the compositions of this invention, all the other substances which could have been used heretofore in the preparation of compositions which may be stored under anhydrous conditions, but when exposed to moisture at room temperature, cross-link to form elastomers. Examples of substances which may be used in these compositions are reinforcing fillers, non-reinforcing fillers, pigments, soluble dyes, fragrances, organopolysiloxane resins, including those consisting of $(CH_3)_3SiO_{\frac{1}{2}}$ and $SiO_{4/2}$ units, per organic resins, such as polyvinyl chloride powder, corrosion inhibitors, oxidation inhibitors, heat stabilizers and solvents. Other agents which may be incorporated in these compositions are those which improve the adhesion of the elastomers produced on the substrates or backings on which the elastomers have been produced, such as, for example a compound having the formula:

$$CH_3Si[O(CH_2)_2NH_2]_2(CH_2)_3O(CH_2)_2NH_2.$$

Also condensation catalysts such as carboxylic acid tin salts or organo tin salts, such as dibutyltin dilaurate or aliphatic basic nitrogen compounds, for example 3-ethoxy-propylamine-1 or n-hexylamine; emollients such as trimethylsiloxy endblocked dimethylpolysiloxanes which are liquid at room temperature, or phosphoric acid esters such as trioleylphosphate, including polyglycols which can be etherified and/or esterified, including organosiloxane-oxyalkylene-block copolymers may be included in the compositions of this invention.

Examples of reinforcing fillers, i.e. fillers having a surface area of at least 50 m²/gm are pyrogenically obtained silicon dioxide, silicic acid-hydrogels which have been dehydrated while maintaining their structure and other types of precipitated silicon dioxide with a surface area of at least 50 m²/gm. If desired, it is possible to use other fillers having a surface area of at least 50 m²/gm instead of the cited types of silicon dioxide or such other fillers can be used in combination with these silicon dioxide fillers. Examples of such other fillers are metal oxides such as titanium dioxide, ferric-oxide, aluminum oxide and zinc oxide, provided that their surface areas are at least 50 m²/gm.

Examples of non-reinforcing fillers, i.e. fillers having a surface area of less than 50 m²/gm are quartz meal, diatomaceous earth, siliceous chalk, Neuburg Chalk, calcium silicate, zirconium silicate, calcium carbonate, for example in the form of ground chalk, and calcined aluminum silicate, as well as powder sodium aluminum silicate having molecular sieve properties. The reinforcing and non-reinforcing fillers can be treated with trimethylethoxysilane or stearic acid to impart hydrophobic properties thereto. If desired, such a treatment can for example be performed in a ball mill.

Fibrous fillers such as asbestos and glass fibers, especially those having an average length of no more than about 0.5 mm, and/or organic fibers may also be used in these compositions.

Mixtures of various reinforcing and/or non-reinforcing fillers may be used.

In the preparation of the compositions of this invention, the components may be mixed in any sequence. Preferably the components are mixed at room temperature and under anhydrous conditions. If desired, however, mixing may be carried out at elevated temperatures, such as for example at a temperature between 35° C. and 150° C.

The moisture present in the air is generally sufficient to cause cross-linking of the compositions of this invention. If desired, cross-linking may however be performed at temperatures below or above room temperature, for example from about 5° to 10° C., and/or by means of aqueous concentrations which exceed the normal water content of the air.

The elastomers prepared from the compositions of this invention adhere to most substrates such as glass, porcelain, ceramics, mortar, aluminum, brass, stainless steel, galvanized iron, wood, paper and plastics such as polyvinyl chloride, polyester, polystyrene or polymethylmethacrylate in the absence of the customary primers. Consequently the compositions of this invention are particularly suited for sealing joints, including vertical joints, and similar hollow areas measuring for example from 1 mm to 50 mm, for example in land, water, or air-borne vehicles, as well as in buildings, including those constructed of light-weight or prefabricated construction elements. The compositions are also useful as adhesives or cementing compositions, as well as for the manufacture of electrical insulators and for coating the most varied substrates, for example for adhesive-repellent paper coatings and still other coatings, for example of metals, synthetic and natural rock, woven or non-woven textiles.

In the following examples, all parts and percentages are by weight unless otherwise specified.

EXAMPLE 1

A mixture consisting of 30 parts of a trimethylsiloxy endblocked dimethylpolysiloxane which has a viscosity of 35 mPs.s at 25° C., 22 parts of a dimethylpolysiloxane having terminal Si-bonded hydroxyl groups and a viscosity of 20,000 mPa.s at 25° C. and 36 parts by weight of a dimethylpolysiloxane which has terminal Si-bonded hydroxyl groups and which has a viscosity of 80,000 mPa.s at 25° C., is mixed with 8.7 parts of silicon dioxide which has been pyrogenically produced in the gaseous phase ("fume silica") having a surface area of 150 m$^2$/gm, 4.4 parts of methyltris-(cyclohexylamino)-silane and 2 parts of an organosilicon compound having amino groups which are bonded to silicon via carbon and siloxane oxygen atoms. The organosilicon compound is obtained by reacting a silane of the formula:

with a dimethylpolysiloxane which has terminal Si-bonded hydroxyl groups and a viscosity of 80 mPa.s at 25° C. According to the NMR spectrum it consists of 16.4 mol percent of Si-bonded CH$_3$O groups, 71 mol percent of dimethylsiloxane units and 12.6 mol percent of a grouping of the formula:

EXAMPLE 2

The procedure described in Example 1 is repeated, except that as an organosilicon compound containing amino groups which are bonded to silicon via carbon and siloxane oxygen atoms, 2 parts of an organosilicon compound obtained from the reaction of a silane of the formula:

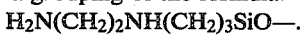

with a dimethylpolysiloxane which has terminal Si-bonded hydroxyl groups that are present in an amount of 3.7 percent is substituted for the organosilicon compound of Example 1. According to the NMR spectrum, this organosilicon compound consists of 0.6 mol percent of Si-bonded C$_2$H$_5$O groups, 95.4 percent dimethylsiloxane units and 4 mol percent of groupings of the formula:

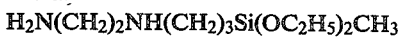

EXAMPLE 3

A mixture containing 32.7 parts of a dimethylpolysiloxane having terminal Si-bonded hydroxyl groups and a viscosity of 80,000 mPa.s at 25° C., 16.3 parts of the dimethylpolysiloxane having terminal Si-bonded hydroxyl groups and a viscosity of 20,000 mPa.s and 19.6 parts of a trimethylsiloxy endblocked dimethylpolysiloxane and a viscosity of 35 mPa.s at 25° C., is mixed with 19.6 parts of calcined aluminum silicate, 6.5 parts of silicon dioxide pyrogenically produced in the gaseous phase and which has a surface area of 150 m$^2$/gm, 1 part sodium aluminum silicate powder having molecular sieve properties, 4.2 parts of methyltris(cyclohexylamino)-silane and 2 parts of the organosilicon compound having amino groups which are bonded to silicon via carbon and siloxane oxygen atoms which is described in Example 1.

COMPARISON EXAMPLE V1

The precedure described in Example 1 is repeated, except that the organosilicon compound having Si-bonded amino groups and siloxane oxygen atoms is omitted.

COMPARISON EXAMPLE V2

The procedure described in Example 3 is repeated, except that the organosilicon compound having amino groups which are bonded to silicon via carbon and siloxane oxygen atoms is omitted.

The compositions prepared in accordance with Examples 1 through 3 as well as those prepared in accordance with Comparison Examples V1 and V2 can be stored under anhydrous conditions and when exposed to atmospheric moisture, cure to an elastomer.

In order to determine the elastomers' ability to adhere to substrates, two pieces of the substances listed in the following Table are glued together with the listed compositions and the composite materials thus obtained are tested in a tensile testing machine in accordance with method 116.1-1960 of the American Standards Association. The following results are obtained:

| Elastomer of Example No. | Adhesion in N/mm$^2$ on | | | |
|---|---|---|---|---|
| | Polyvinyl Chloride | Brass | Galvanized Iron | Stainless Steel |
| Example 1 | 0.38 | 0.38 | 0.36 | 0.35 |
| Example 2 | 0.37 | 0.37 | 0.39 | 0.40 |
| Example 3 | 0.68 | 0.68 | 0.76 | 0.80 |
| Comparison Example V$_1$ | 0.0 | 0.13 | 0.0 | 0.29 |
| Comparison Example V$_2$ | 0.0 | 0.0 | 0.0 | 0.0 |

What is claimed is:

1. A curable composition which is stable under anhydrous conditions, but when exposed to moisture, cures to an elastomer consisting essentially of (1) a diorganopolysiloxane having terminal condensable groups, (2) a silicon compound having at least 3 hydrolyzable groups per molecule, said hydrolyzable groups are selected from the group consisting of amino groups which are bonded to silicon via nitrogen, oxime groups which are bonded to silicon via oxygen and mixtures thereof and (3) at least one organosilicon compound having at least one amino group which is bonded to silicon via carbon and at least one siloxane-oxygen atom.

2. The composition of claim 1, wherein the organosilicon compound (3) contains at least one organopolysiloxane of the formula:

Y(OSiR$_2$)$_m$(OSiAR)$_n$OY in which R is selected from the group consisting of a monovalent hydrocarbon radical and a substituted monovalent hydrocarbon radical, and A represents a radical of the formula:

—(CH$_2$)$_p$[Q$_a$(CH$_2$)$_p$]$_p$NR$_2^1$ where R$^1$ is selected from the group consisting of a hydrogen and a monovalent, hydrocarbon radical and a substituted monovalent hydrocarbon radical, Q is selected from the group consisting of oxygen and the —NR$^1$ radical, a is 0 or 1, p is an integer having a value of from 1 to 20, and Y represents a radical of the formula:

—SiA$_a$(OR$^2$)$_b$R$_{3-a-b}$ where A, R and a are the same as above, R$^2$ is selected from the group consisting of hydrogen and hydrocarbon radicals which may be interrupted by at least one ether-oxygen atom; b is 0, 1, 2 or 3, with the proviso that the sum of a+b is not greater than 3; m is 0 or an integer having a value of from 1 to 2,000 and n is 0 or an integer having a value of from 1 to 1,000, with the proviso that at least one A radical must be present for each organopolysiloxane (3).

3. The composition of claim 2, wherein A is a radical of the formula:

—(CH$_2$)$_{p'}$[Q$_{a'}$(CH$_2$)$_{p''}$]$_{p'''}$NR$_2^5$ where Q is selected from the group consisting of oxygen and the —NR$^1$ radical, a' is 1, p' is 3, p'' is 2, p''' is 1 and R$^5$ is hydrogen.

4. The composition of claims 1 or 2, wherein the organosilicon compound (3) is present in an amount of from 0.1 to 20 percent by weight, based on the total weight of the composition.

5. The composition of claim 3, wherein the organosilicon compound is present in an amount of from 0.1 to 20 percent by weight, based on the total weight of the composition.

6. A cured composition which is obtained by exposing the composition of claim 1 to atmospheric moisture.

7. A cured composition which is obtained by exposing the composition of claim 2 to atmospheric moisture.

* * * * *